United States Patent
Kobayashi

(10) Patent No.: US 10,120,834 B2
(45) Date of Patent: Nov. 6, 2018

(54) SIGNAL PROCESSING DEVICE AND SIGNAL PROCESSING METHOD USING A CORRESPONDING TABLE AND A SWITCHING PATTERN

(71) Applicant: FUJITSU LIMITED, Kawasaki-shi, Kanagawa (JP)

(72) Inventor: Noboru Kobayashi, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 709 days.

(21) Appl. No.: 14/292,247

(22) Filed: May 30, 2014

(65) Prior Publication Data

US 2014/0359251 A1 Dec. 4, 2014

(30) Foreign Application Priority Data

Jun. 3, 2013 (JP) ................................. 2013-117358

(51) Int. Cl.
*G06F 15/80* (2006.01)

(52) U.S. Cl.
CPC ...... *G06F 15/8053* (2013.01); *G06F 15/8092* (2013.01)

(58) Field of Classification Search
CPC .................................................. G06F 15/8053
USPC .......................................................... 712/3
See application file for complete search history.

(56) References Cited

U.S. PATENT DOCUMENTS

| | | | |
|---|---|---|---|
| 2006/0271764 A1* | 11/2006 | Nilsson | G06F 9/30014 712/34 |
| 2010/0186006 A1 | 7/2010 | Bougard et al. | |
| 2013/0067203 A1* | 3/2013 | Chung | G06F 9/30032 712/222 |
| 2013/0242832 A1* | 9/2013 | Koc | H04W 28/0268 370/311 |
| 2014/0006748 A1* | 1/2014 | Stewart | G06F 15/7867 712/3 |

FOREIGN PATENT DOCUMENTS

JP 2010-224853 A 10/2010
WO WO 2006/017339 A2 2/2006

OTHER PUBLICATIONS

Ge (Ge, Yi, Fujitsu Sci. Tech. J., vol. 50, No. 1, pp. 132-137, Jan. 2014 ).*

* cited by examiner

*Primary Examiner* — Keith E Vicary
*Assistant Examiner* — William V Nguyen
(74) *Attorney, Agent, or Firm* — Arent Fox LLP

(57) ABSTRACT

A signal processing device including: one or more vector processors configured to perform vector processing to a signal using a parameter, one or more scalar processors configured to perform scalar processing for generating the parameter, a first circuit coupled to the one or more vector processors and the one or more scalar processors and configured to transfer the parameter from the one or more scalar processors to the one or more vector processors, and a second circuit coupled to the one or more vector processors and another circuit that inputs the signal to the second circuit, and configured to transfer the signal among the one or more vector processors and the other circuit.

14 Claims, 17 Drawing Sheets

| SWITCHING PATTERN | PROCESSOR NUMBER | | | | | | | | | | CONNECTION SWITCHING UNIT NUMBER | | | | | | | | | | | | | | |
|---|---|---|---|---|---|---|---|---|---|---|---|---|---|---|---|---|---|---|---|---|---|---|---|---|---|
| | | | | | | | | | | | 21-1 | | | 21-2 | | 21-3 | | | 21-4 | | 21-5 | | 51-1 | 51-2 | 51-3 | 51-4 | 51-5 |
| | 12-1 | 12-2 | 12-3 | 12-4 | 12-5 | 14-1 | 14-2 | 14-3 | 14-4 | 14-5 | A | B | C | A | B | C | A | B | C | A | B | C | A | B | C | D | E | D | E | D | E | D | E | D | E |
| 1 | O | | | | O | | | | | | | O | | | | | | | | | | | | | | O | | | | | | | | | |
| 2 | | O | | | | O | | O | | | | | | O | O | | O | | | O | | | | | | O | | | | | | | | | O |
| 3 | O | O | O | | | | O | O | | O | O | O | O | | O | O | | | | O | O | | | | | | O | | O | | | | | | O |
| 4 | O | O | O | O | O | O | O | O | O | O | O | | | O | | | O | | | O | | | O | O | | | | O | O | | | | | | O |

| CONTROL | A | B |
|---------|---|------|
| 0 | 0 | Hi-Z |
| 0 | 1 | Hi-Z |
| 1 | 0 | 0 |
| 1 | 1 | 1 |

FIG. 10

| TYPE OF PROCESS | SWITCHING PATTERN |
|---|---|
| CELL SEARCH | 1 |
| RACH PROCESS | 2 |
| SCH TRANSMISSION/RECEPTION PROCESS (DURING LOW LOAD CONDITIONS) | 3 |
| SCH TRANSMISSION/RECEPTION PROCESS (DURING HIGH LOAD CONDITIONS) | 4 |

FIG. 11

| SWITCHING PATTERN | PROCESSOR NUMBER | | | | | | | | | | CONNECTION SWITCHING UNIT NUMBER | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | 12-1 | 12-2 | 12-3 | 12-4 | 12-5 | 14-1 | 14-2 | 14-3 | 14-4 | 14-5 | 21-1 | | | 21-2 | | | 21-3 | | | 21-4 | | | 21-5 | | | 51-1 | | | 51-2 | 51-3 | 51-4 | 51-5 |
| | | | | | | | | | | | A | B | C | A | B | C | A | B | C | A | B | C | A | B | C | C | D | E | D E | D E | D E | D E |
| 1 | O | | | | | O | | | | | O | | | | | | | | | | | | | | | | O | | | | | |
| 2 | | O | | | | | | | | | | O | O | O | O | | | | | | | | | | | | O | O | | | | |
| 3 | O | O | | O | | | | O | | | | | | | O | O | O | | | O | O | | | | | | | | O O | O | | |
| 4 | O | | O | | O | | | | O | O | O | | | | | | | O | | | | | | O | | | O | | | O | O | O O O |

SIGNAL PROCESSING DEVICE AND SIGNAL PROCESSING METHOD USING A CORRESPONDING TABLE AND A SWITCHING PATTERN

CROSS-REFERENCE TO RELATED APPLICATION

This application is based upon and claims the benefit of priority of the prior Japanese Patent Application No. 2013-117358, filed on Jun. 3, 2013, the entire contents of which are incorporated herein by reference.

FIELD

The embodiments discussed herein are related to a signal processing device and a signal processing method.

BACKGROUND

In recent years, the number of functions that can be embodied in a portable terminal has been growing. That is, in recent years, a portable terminal is configured such that applications of various kinds such as animation reproduction and music reproduction, as well as signal processing in wireless communication, are executable. For example, a portable terminal includes a communication processor (for example, communication central processing unit (CPU)) that performs communication processing and an application processor that executes applications of various kinds. The communication processor and the application processor are in some cases implemented as individual chips, and in other cases are integrated as a single large scale integration (LSI) chip.

Also in recent years, a portable terminal that allows for a plurality of communication schemes has been desired. Examples of the plurality of communication schemes include a second generation (2G) scheme such as global system for mobile communications (GSM) (registered trademark), a third generation (3G) scheme such as wideband code division multiple access (WCDMA) (registered trademark) or high speed packet access (HSPA), and a fourth generation scheme such as long term evolution (LTE). It is possible to realize a portable terminal that allows for a plurality of communication schemes, for example, by mounting hardware specialized for each communication scheme in the portable terminal.

However, providing hardware specialized for each communication scheme can result in an increase in the circuit size of a portable terminal. Providing hardware specialized for each communication scheme also makes it difficult to apply a new communication scheme to portable terminals that have already circulated.

Given these circumstances, to date, there have been some cases where a portable terminal is provided with general-purpose hardware, such as a digital signal processor (DSP), and firmware processing is performed using the general-purpose hardware. Firmware processing includes scalar processing that calculates a parameter and vector processing that performs actual signal processing based on the calculated parameter.

Japanese National Publication of International Patent Application No. 2008-507039, Japanese Laid-open Patent Publication No. 2010-224853, and Japanese National Publication of International Patent Application No. 2010-530677 disclose examples of the related art.

SUMMARY

According to an aspect of the invention, a signal processing device includes one or more vector processors configured to perform vector processing to a signal using a parameter, one or more scalar processors configured to perform scalar processing for generating the parameter, a first circuit coupled to the one or more vector processors and the one or more scalar processors and configured to transfer the parameter from the one or more scalar processors to the one or more vector processors, and a second circuit coupled to the one or more vector processors and another circuit that inputs the signal to the second circuit, and configured to transfer the signal among the one or more vector processors and the other circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of a correspondence table;

FIG. 11 illustrates an example of a pattern table;

DESCRIPTION OF EMBODIMENTS

Figure 1:
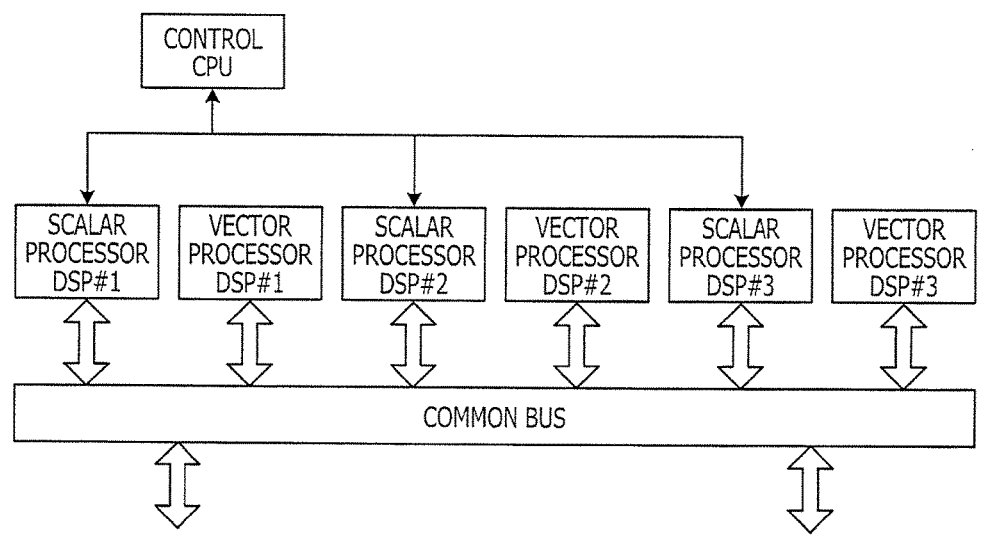
FIG. 1 is a diagram illustrating an example of a signal processing device supporting the related art.

For example, the configuration illustrated in FIG. 1 is considered as a configuration of a signal processing device that performs firmware processing using general-purpose hardware. FIG. 1 is a diagram illustrating an example of a signal processing device supporting the related art. In FIG. 1, the signal processing device includes a control CPU, scalar DSPs #1 to #3, vector DSPs #1 to #3, and a common bus. The scalar DSPs #1 to #3 and the vector DSPs #1 to #3 are connected via the common bus. Then, the control CPU outputs an instruction to each scalar DSP. Then, the scalar DSP calculates a parameter and delivers the calculated parameter to a vector DSP that is to use the calculated parameter. The vector DSP performs signal processing on a signal from a wireless unit using the received parameter, and delivers the result of signal processing to a vector DSP that is to perform signal processing at the next step or to a function unit in Layer 2. With this configuration, the correspondence relationship between scalar DSPs and vector DSPs may be flexibly controlled.

However, since a control signal of a parameter or the like and a main signal, which is an output of a wireless circuit, are transmitted through the common bus, there is a possibility that congestion will occur. In addition, in order to correctly deliver a control signal and a main signal transmitted through the common bus to a destination DSP, identification information of the destination DSP is to be added to that control signal and that main signal. In addition, a vector DSP is to determine whether a received signal is a main signal or a control signal, and therefore there is a possibility that the vector DSP will not concentrate on vector processing.

In view of the above, it is an object of the techniques disclosed herein to provide a signal processing device and a signal processing method that makes it possible to achieve inhibition of congestion and reduction in signal processing load.

Hereinafter, embodiments of a signal processing device and a signal processing method disclosed in the present application will be described in detail with reference to the accompanying drawings. Note that the signal processing device and the signal processing method disclosed in the present application are not limited by the embodiments. Also, configurations having the same functions among the embodiments are denoted by the same reference numerals, and redundant description thereof are omitted.

First Embodiment

[Configuration of Signal Processing Device]

Figure 2:
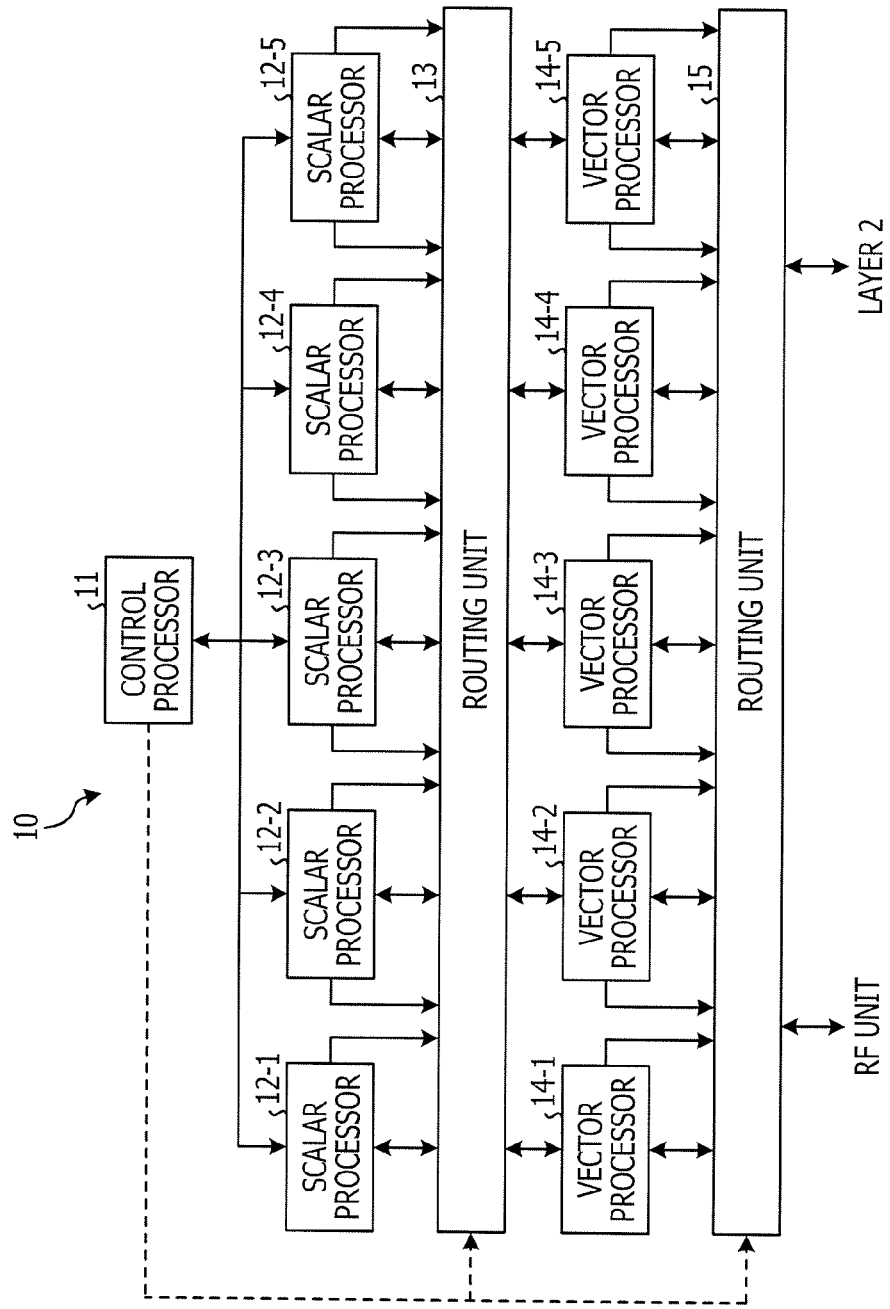
FIG. 2 is a block diagram illustrating an example of a signal processing device of a first embodiment.

FIG. 2 is a block diagram illustrating an example of a signal processing device of a first embodiment. In FIG. 2, the signal processing device 10 includes a control processor 11, scalar processors 12-1 to 12-5, a routing unit 13, vector processors 14-1 to 14-5, and a routing unit 15. Note that while five scalar processors 12 and five vector processors 14 are provided here, the numbers of the processors are not limited to this. Also, hereinafter, the scalar processors 12-1 to 12-5 may be generically referred to as scalar processors 12 unless they are particularly distinguished from one another. Also, hereinafter, the vector processors 14-1 to 14-5 may be generically referred to as vector processors 14 unless they are particularly distinguished from one another. Also, hereinafter, the routing unit 13 may be referred to as a first routing unit (or a first circuit), and the routing unit 15 may be referred to as a second routing unit (or a second circuit).

The control processor 11 controls the entire signal processing device 10. For example, the control processor 11 switches the route of a control signal in the routing unit 13. The control processor 11 also switches the route of a main signal in the routing unit 15. The control processor 11 also switches the scalar processors 12-1 to 12-5 between the on and off states. The control processor 11 also switches the vector processors 14-1 to 14-5 between the on and off states. Then, the control processor 11 changes such switching based on the type of process. Examples of the type of process may include a cell search process, a random access channel (RACH) process, and a shared channel (SCH) transmission/reception process.

The scalar processor 12 calculates a parameter and outputs the parameter to the routing unit 13. The scalar processor 12 is, for example, a digital signal processor (DSP).

The routing unit 13 switches the connection states between the scalar processors 12-1 to 12-5 and the vector processors 14-1 to 14-5. In this way, the vector processor 14 that acquires a control signal including a parameter calculated in the scalar processor 12 may be switched.

The vector processor 14 performs vector processing on a signal to be processed (that is, a main signal) acquired through the routing unit 15, using a parameter calculated in the scalar processor 12. The vector processor 14 is, for example, a DSP.

The routing unit 15 transmits a signal to be processed (that is, a main signal). The signal to be processed is, for example, a reception signal received from a radio frequency (RF) unit or a sending signal received from Layer 2.

Figure 3:
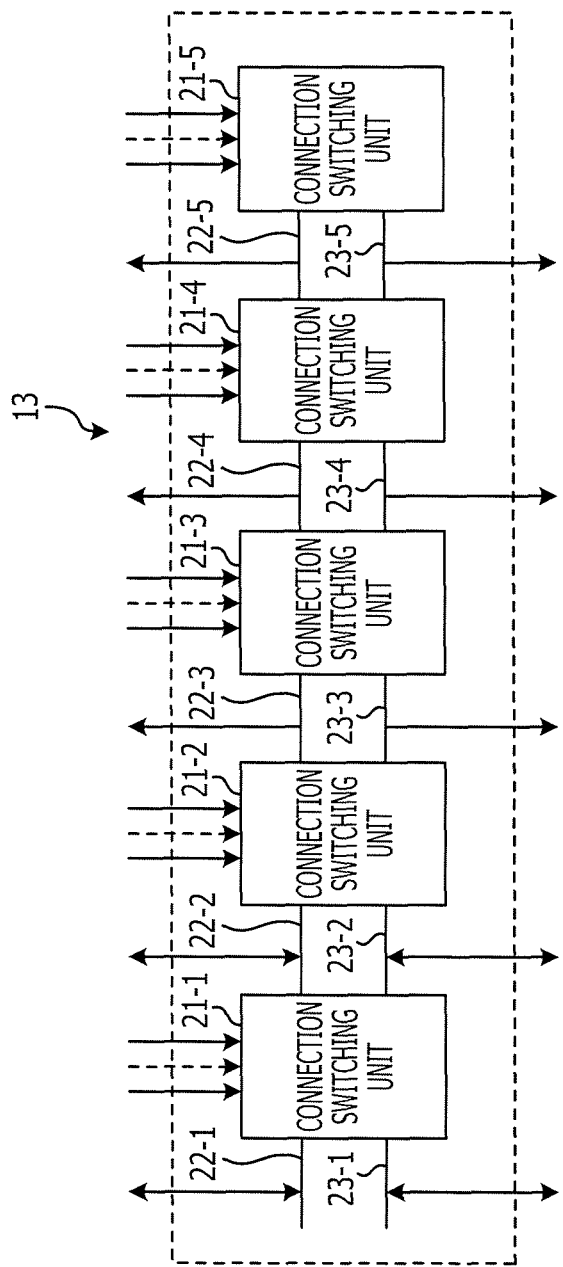
FIG. 3 is a diagram illustrating an example of a first routing unit in the signal processing device of the first embodiment.

FIG. 3 is a diagram illustrating an example of a first routing unit in the first signal processing device of the first embodiment. In FIG. 3, the routing unit 13 includes connection switching units 21-1 to 21-5, partial signal lines 22-1 to 22-5 on the side of the scalar processors 12, and partial signal lines 23-1 to 23-5 on the side of the vector processors 14. Hereinafter, the connection switching units 21-1 to 21-5 are generically referred to as connection switching units 21 if they are not particularly distinguished from one another. Also, hereinafter, the partial signal lines 22-1 to 22-5 are generically referred to as partial signal lines 22 if they are not particularly distinguished from one another. Also, hereinafter, the partial signal lines 23-1 to 23-5 may be generically referred to as partial signal lines 23 if they are not particularly distinguished from one another.

The partial signal lines 22-1 to 22-5 are coupled to the scalar processors 12-1 to 12-5, respectively. Also, the partial signal lines 23-1 to 23-5 are coupled to the vector processors 14-1 to 14-5, respectively. That is, the partial signal lines 22-1 to 22-5 correspond to local buses of the scalar processors 12-1 to 12-5, respectively. Also, the partial signal lines 23-1 to 23-5 correspond to local buses of the vector processors 14-1 to 14-5, respectively.

The connection switching unit 21 switches the connection state between the partial signal line 22 and the partial signal line 23 facing each other (for example, the connection state between the partial signal line 22-1 and the partial signal line 23-1). The connection switching unit 21 also switches the connection state between the partial signal lines 22 adjacent to each other (for example, the connection state between the partial signal line 22-1 and the partial signal line 22-2). The connection switching unit 21 also switches the connection state between the partial signal lines 23 adjacent to each other (for example, the connection state between the partial signal line 23-1 and the partial signal line 23-2). That is, the connection switching unit 21 functions as a bus bridge. With this configuration of the connection switching unit 21, groups of the scholar processors 12 and the vector processors 14 may be flexibly switched.

Figure 4:
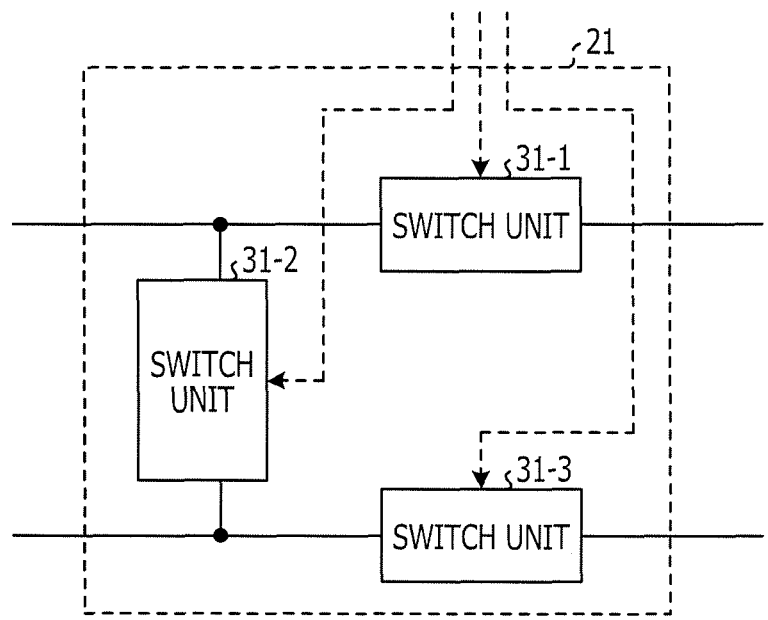
FIG. 4 is a diagram illustrating an example of a connection switching unit in the first routing unit.

For example, the connection switching unit 21 includes switch units 31-1 to 31-3 as illustrated in FIG. 4. FIG. 4 is a diagram illustrating an example of the connection switching unit in the first routing unit. Hereinafter, the switch units 31-1 to 31-3 are generically referred to as switch units 31 if they are not particularly distinguished from one another.

The switch unit 31-1 is turned on or off based on a switching control signal received from the control processor 11. Thereby, the switch unit 31-1 may switch the connection state between the partial signal lines 22 adjacent to each other.

Also, the switch unit 31-2 is turned on or off based on a switching control signal received from the control processor 11. Thereby, the switch unit 31-2 may switch the connection state between the partial signal line 22 and the partial signal line 23 facing each other.

Also, the switch unit 31-3 is turned on or off based on a switching control signal received from the control processor 11. Thereby, the switch unit 31-3 may switch the connection state between the partial signal lines 23 adjacent to each other.

Figure 5:
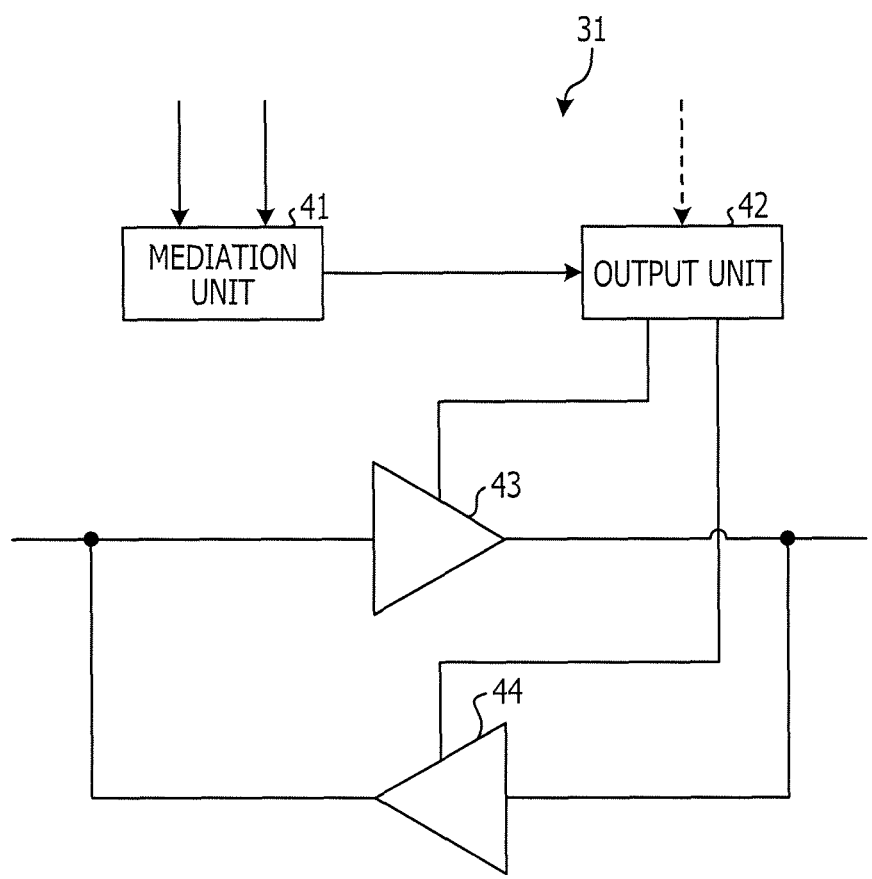
FIG. 5 is a diagram illustrating an example of a switch unit.

The switch unit 31 includes a mediation unit 41, an output unit 42, and switch elements 43 and 44 as illustrated in FIG. 5. FIG. 5 is a diagram illustrating an example of a switch unit. The switch elements 43 and 44 are, for example, transistors.

The output unit 42 takes as an input a switching control signal output from the control processor 11. A switching control signal takes a value "0" or "1"; "0" indicates the off state, and "1" indicates the on state. Then, if a switching control signal of "0" is input to the output unit 42, the output unit 42 inputs a control signal of "0" to the switch elements 43 and 44. If a switching control signal of "1" is input to the output unit 42, the output unit 42 inputs "0" to one of the switch elements 43 and 44 and inputs "1" to the other, in accordance with an output signal of the mediation unit 41. For example, in the switch unit 31-1 of the connection switching unit 21-1, when accessed by the scalar processor 12-1, the mediation unit 41 outputs a control signal so that "1" is output from the output unit 42 to the switch element 43. On the other hand, in the switch unit 31-1 of the connection switching unit 21-1, when accessed by the scalar processor 12-2, the mediation unit 41 outputs a control signal so that "1" is output from the output unit 42 to the switch element 44. In addition, when simultaneously accessed by the scalar processor 12-1 and the scalar processor 12-2, the mediation unit 41 outputs a control signal so that "1" is output from the output unit 42 to the switch element 43 or the switch element 44.

Figure 6:
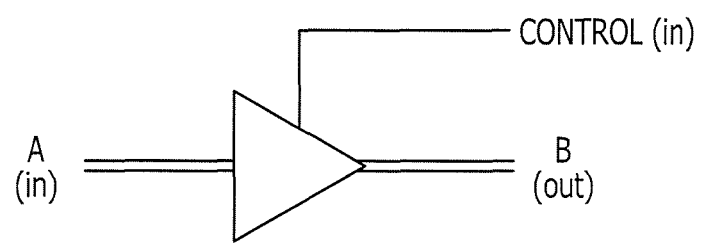
FIG. 6 is an illustration presented for explanation of the relationship between input and output of a switch element in accordance with a control signal.

FIG. 6 is an illustration presented for explanation of the relationship between the input and the output of a switch element in accordance with a control signal. As illustrated in FIG. 6, if the control signal received from the output unit 42 is "0", the switch element does not produce an output, regardless of the value of input (A). That is, if the control signal received from the output unit 42 is "0", the switch element will be in the off state. In contrast, if the control signal received from the output unit 42 is "1", the switch element outputs the value of an input (A) without the value of the input (A) being changed. Here, both of the switch elements 43 and 44 have this characteristic. Then, the switch elements 43 and 44 are arranged in anti-parallel, and "0" and "1" are input as control signals to one and the other of the switch elements 43 and 44, respectively. In this way, the transmission direction of a signal in the switch unit 31 may be controlled.

Figure 7:
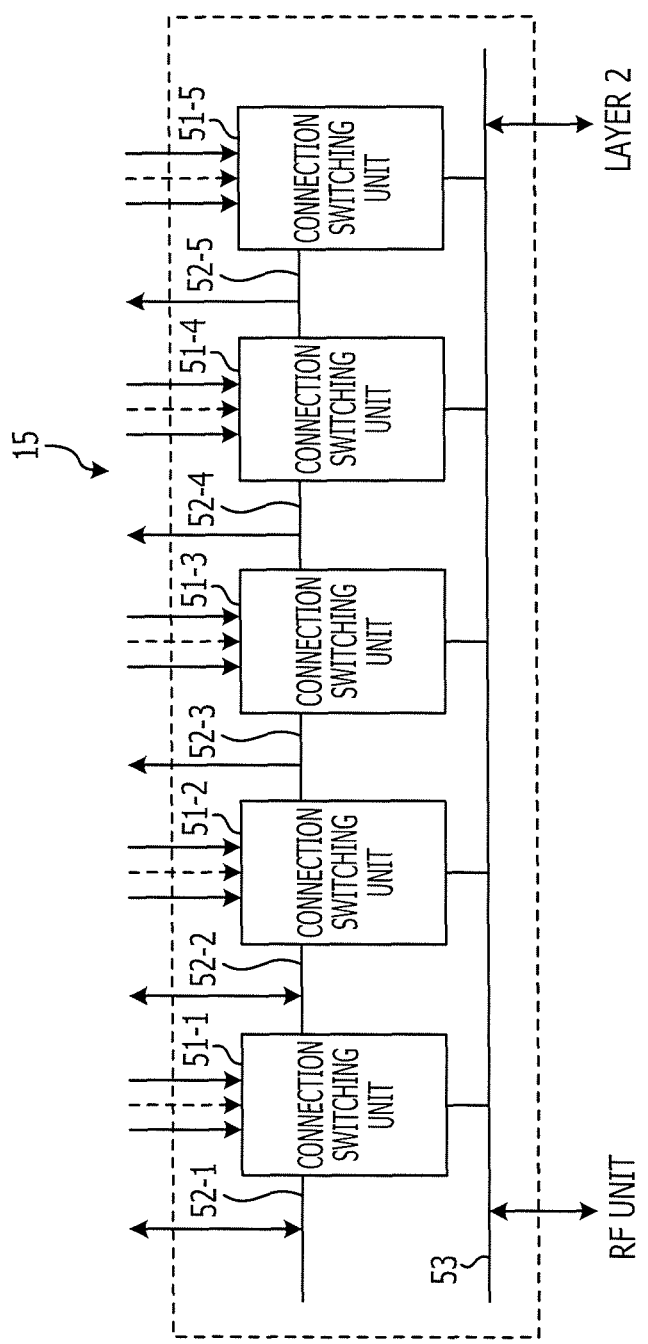
FIG. 7 is a diagram illustrating an example of a second routing unit in the signal processing device of the first embodiment.

FIG. 7 is a diagram illustrating an example of a second routing unit in the signal processing device of the first embodiment. In FIG. 7, the routing unit 15 includes connection switching units 51-1 to 51-5, partial signal lines 52-1 to 52-5, and a signal line 53. Hereinafter, the connection switching units 51-1 to 51-5 are generically referred to as connection switching units 51 if they are not particularly distinguished from one another. Also, hereinafter, the partial signal lines 52-1 to 52-5 are generically referred to as partial signal lines 52 if they are not particularly distinguished from one another.

The partial signal lines 52-1 to 52-5 are coupled to the vector processors 14-1 to 14-5, respectively. That is, the partial signal lines 52-1 to 52-5 correspond to local buses of the scalar processors 12-1 to 12-5, respectively.

The connection switching unit 51 switches the connection state between the partial signal line 52 and the signal line 53 (for example, the connection state between the partial signal line 52-1 and the signal line 53). The connection switching unit 51 also switches the connection state between the partial signal lines 52 adjacent to each other (for example, the connection state between the partial signal line 52-1 and the partial signal line 52-2). That is, the connection switching unit 51 functions as a bus bridge.

Figure 8:
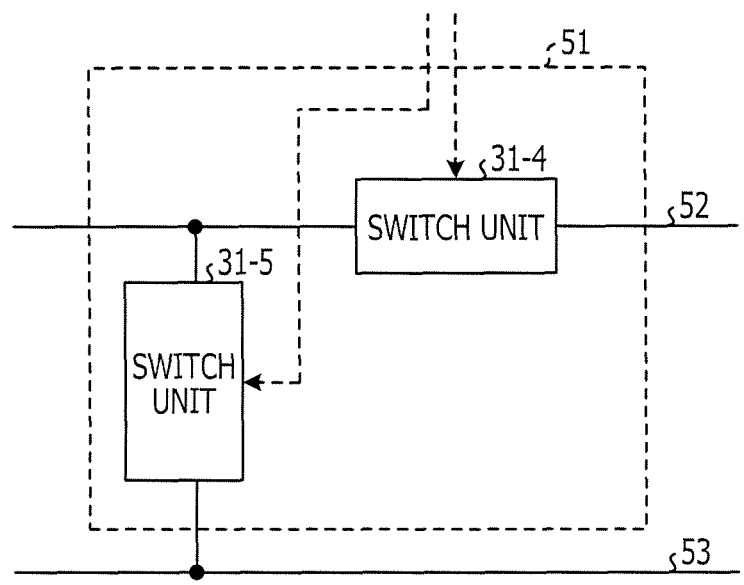
FIG. 8 is a diagram illustrating an example of a connection switching unit in the second routing unit.

For example, the connection switching unit 51 includes switch units 31-4 and 31-5 as illustrated in FIG. 8. FIG. 8 is a diagram illustrating an example of a connection switching unit in the second routing unit. Hereinafter, the switch units 31-4 and 31-5 are generically referred to as switch units 31 if they are not particularly distinguished from each other. The switch unit 31 has a configuration similar to that illustrated in FIG. 5.

The switch unit 31-4 is turned on or off based on a switching control signal received from the control processor 11. Thereby, the switch unit 31-4 may switch the connection state between the partial signal lines 52 adjacent to each other.

Also, the switch unit 31-5 is turned on or off based on a switching control signal received from the control processor 11. Thereby, the switch unit 31-5 may switch the connection state between the partial signal line 52 and the signal line 53.

[Operations of Signal Processing Device]

Figure 9:
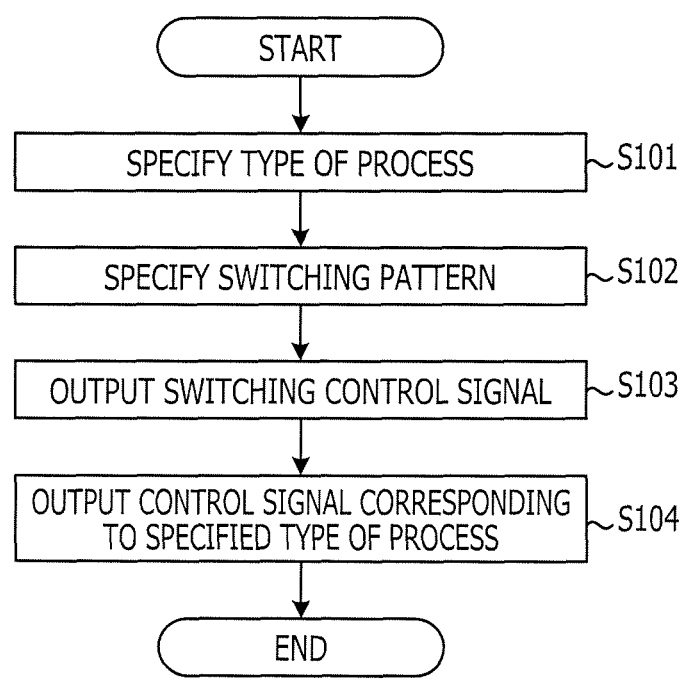
FIG. 9 is a flowchart illustrating an example of processing operations of the signal processing device of the first embodiment.

An example of processing operations of the signal processing device 10 having the above configuration will be described. FIG. 9 is a flowchart illustrating an example of processing operations of the signal processing device of the first embodiment.

In the signal processing device 10, the control processor 11 specifies a type of process to be performed (step S101). For example, the control processor 11 specifies a type of process to be performed among the cell search process, the RACH process, and the SCH transmission/reception process. Further, in the case of the SCH transmission/reception process, the control processor 11 may distinguish an SCH transmission/reception process during low load conditions from an SCH transmission/reception process during high load conditions, based on the amount of processing.

The control processor 11 specifies a switching pattern corresponding to the specified type of process, based on the specified type of process and a correspondence table (step S102). FIG. 10 illustrates an example of a correspondence table. As illustrated in FIG. 10, in the correspondence table, a plurality of processes are associated with identification information of switching patterns in accordance with respective ones of the plurality of processes. For example, if the cell search process is specified in step S101, the control processor 11 specifies a switching pattern 1 in step S102.

Figure 12:
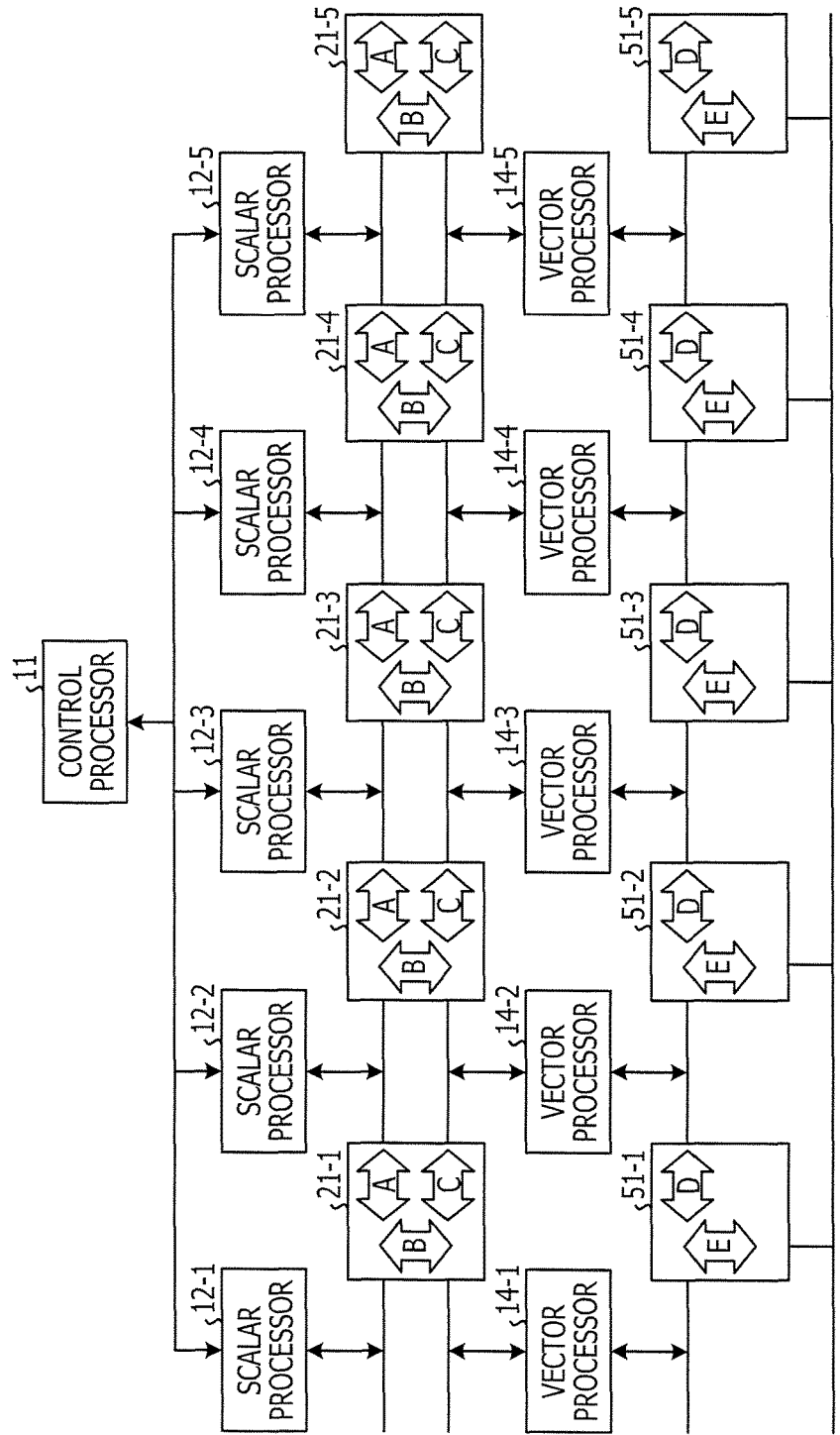
FIG. 12 is a diagram presented for explanation of processing operations of the signal processing device.

The control processor 11 outputs a switching control signal in accordance with the specified pattern in step S102 to the scalar processors 12-1 to 12-5, the vector processors 14-1 to 14-5, the connection switching units 21-1 to 21-5, and the connection switching units 51-1 to 51-5 (step S103). This switching control signal indicates the on or off state of each of the scalar processors 12-1 to 12-5 and each of the vector processors 14-1 to 14-5, and the on or off state of each switch unit of each of the connection switching unit 21-1 to 21-5 and the connection switching units 51-1 to 51-5. For example, the control processor 11 generates a switching control signal, based on the identification information of the switching pattern specified in step S102 and the pattern table. FIG. 11 illustrates an example of the pattern table. In FIG. 11, each switching pattern has a configuration in which some of the components are marked with circles. The configuration indicates that the marked components are turned on in that switching pattern. That is, for example, if a switching pattern 1 is specified in step S102, the control processor 11 generates a switching control signal with which the scalar processor 12-1, the vector processor 14-1, the switch unit B of the connection switching unit 21-1, and the switch unit E of the connection switching unit 51-1 are turned on, and the other components are turned off. Note that, as illustrated in FIG. 12, here, the switch units 31-1 to 31-3 in the connection switching unit 21 are referred to as switch units A, B, and C, respectively. Also, the switch units 51-4 and 51-5 in the connection switching unit 51 are referred to as switch units D and E, respectively. FIG. 12 is a diagram presented for explanation of processing operations of the signal processing device.

Then, the control processor 11 outputs a control signal corresponding to the type of process specified in step S101 to the scalar processors 12 that have been turned on under control in step S103 (step S104).

Note that, at a point in time when switching between the on state and the off state is completed in accordance with a switching control signal, the scalar processors 12-1 to 12-5 may issue a switching completion notification to the control processor 11. Also, at a point in time when signal processing is completed in accordance with a control signal, the vector processors 14-1 to 14-5 may issue a process completion notification to the control processor 11.

Here, a specific example of the connection pattern of each type of process will be described. FIG. 13 to FIG. 16 are diagrams presented for explanation of connection patterns.

<Cell Search Process>

Figure 13:
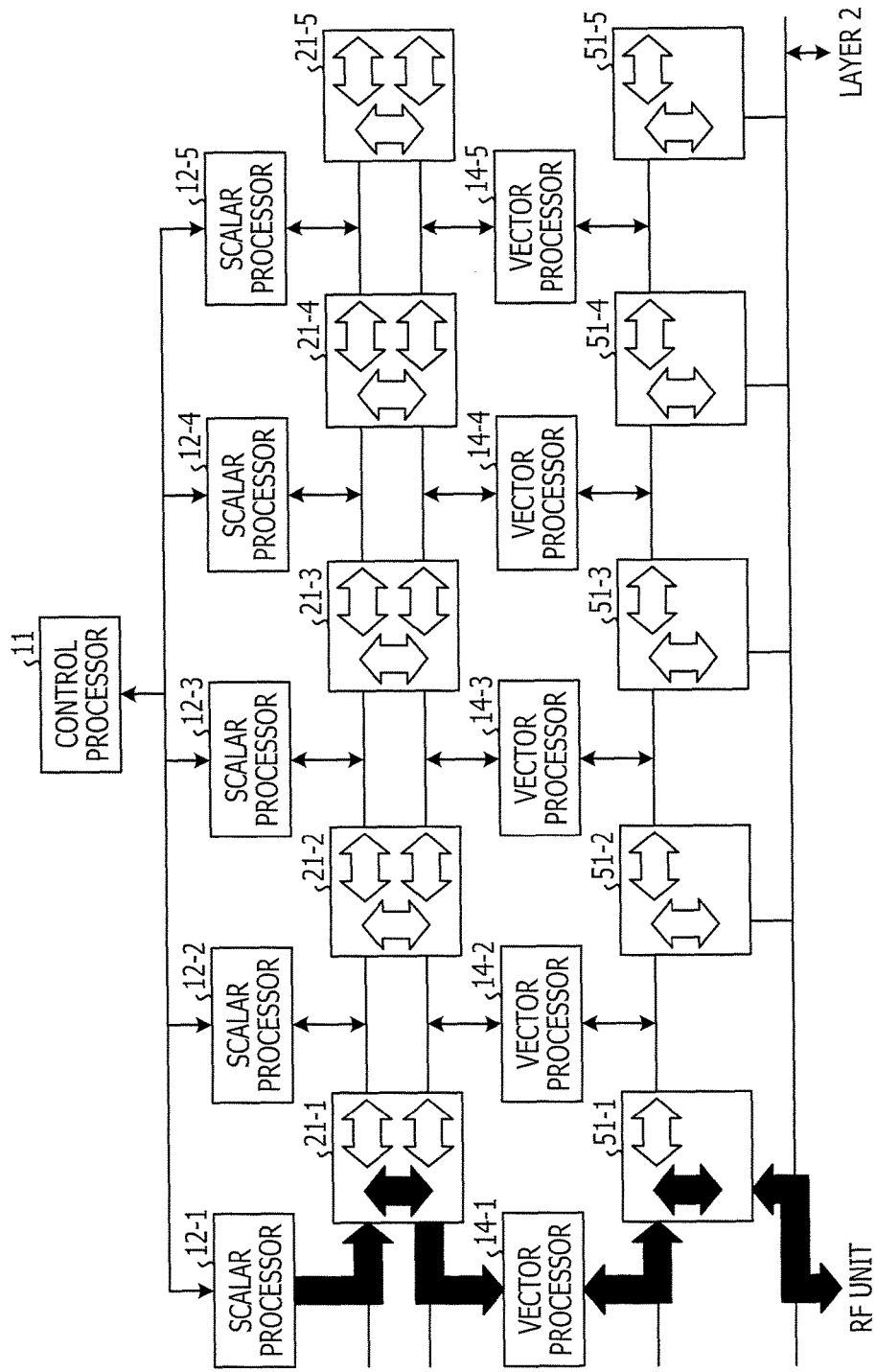
FIG. 13 is a diagram presented for explanation of a specific example of a connection pattern.

In the case where the cell search process is performed, as illustrated in FIG. 13, the control processor 11 in the signal processing device 10 turns on the scalar processor 12-1 and turns off the scalar processors 12-2 to 12-5. In this way, only some of the processors are turned on, and thereby power consumption may be reduced. The control processor 11 also turns on the vector processor 14-1 and turns off the vector processors 14-2 to 14-5. The control processor 11 also turns on only the switch unit B of the connection switching unit 21-1 and the switch unit E of the connection switching unit 51-1, and turns off the other switch units. That is, in the cell search process, the scalar processor 12-1 calculates a parameter used for the cell search process, and the vector processor 14-1 performs vector processing on a main signal using the parameter calculated in the scalar processor 12-1. Specifically, the cell search process is a process of identifying the identification information of a base station, which is the sending source, a frame timing, and so on using synchronization signals (a primary synchronize signal (PSS) and a secondary synchronize signal (SSS)) sent from the base station. Accordingly, the main signal to be processed by the vector processor 14-1 is a reception signal received from the RF unit. Note that after the scalar processor 12-1 calculates a parameter and passes the parameter to the vector processor 14-1, the scalar processor 12-1 may enter a low-power mode.

<RACH Process>

Figure 14:
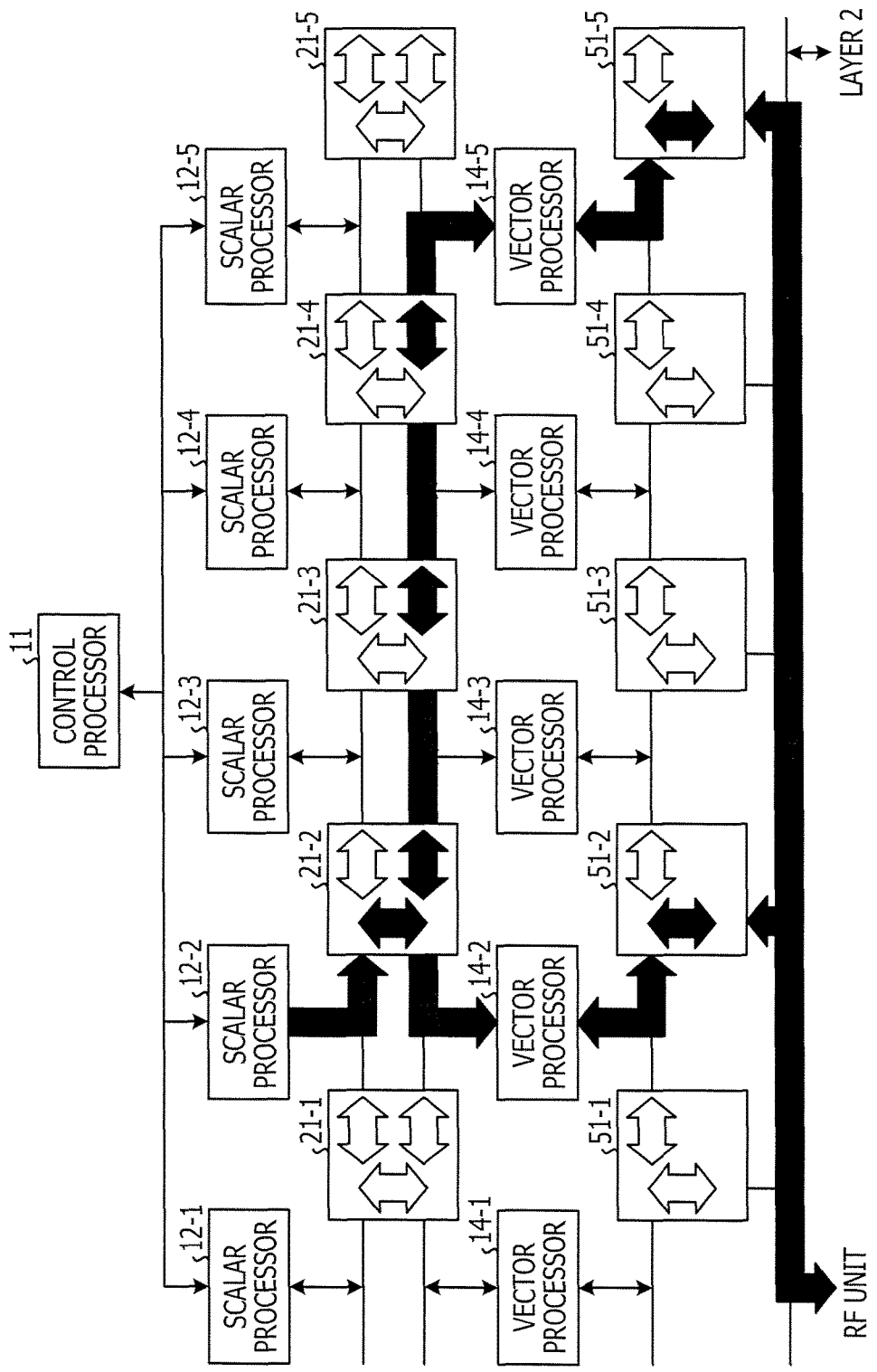
FIG. 14 is a diagram presented for explanation of a specific example of a connection pattern.

In the case where the RACH process is performed, as illustrated in FIG. 14, the control processor 11 in the signal processing device 10 turns on the scalar processor 12-2 and turns off the scalar processors 12-1 and 12-3 to 12-5. The control processor 11 also turns on the vector processors 14-2 and 14-5 and turns off the vector processors 14-1, 14-3, and 14-4. The control processor 11 also turns on only the switch units B and C of the connection switching unit 21-2, the switch unit C of the connection switching units 21-3 and 21-4, and the switch units E of the connection switching units 51-2 and 51-5, and turns off the other switch units. By switching the states of the connection switching units 21 in such a way, the number of vector processors 14 connected to one scalar processor 12 may be changed.

Here, the RACH process is a process of making a request for connection of a base station detected in the cell search process. For example, in the RACH process, an RACH preamble is sent to the base station, and a response is returned from the base station that has received the RACH preamble. Then, the scalar processor 12-2 calculates a parameter used for modulation processing of the RACH preamble and a parameter used for demodulation processing of the response from the base station. Then, using the parameter calculated at the scalar processor 12-2, the vector processor 14-5 performs modulation processing of the RACH preamble and delivers the RACH preamble to the RF unit. Thus, the RACH preamble is sent. Also, the vector processor 14-2 demodulates the response from the base station using the parameter calculated in the scalar processor 12-2.

<SCH Transmission/Reception Process (during Low Load Conditions)>

Figure 15:
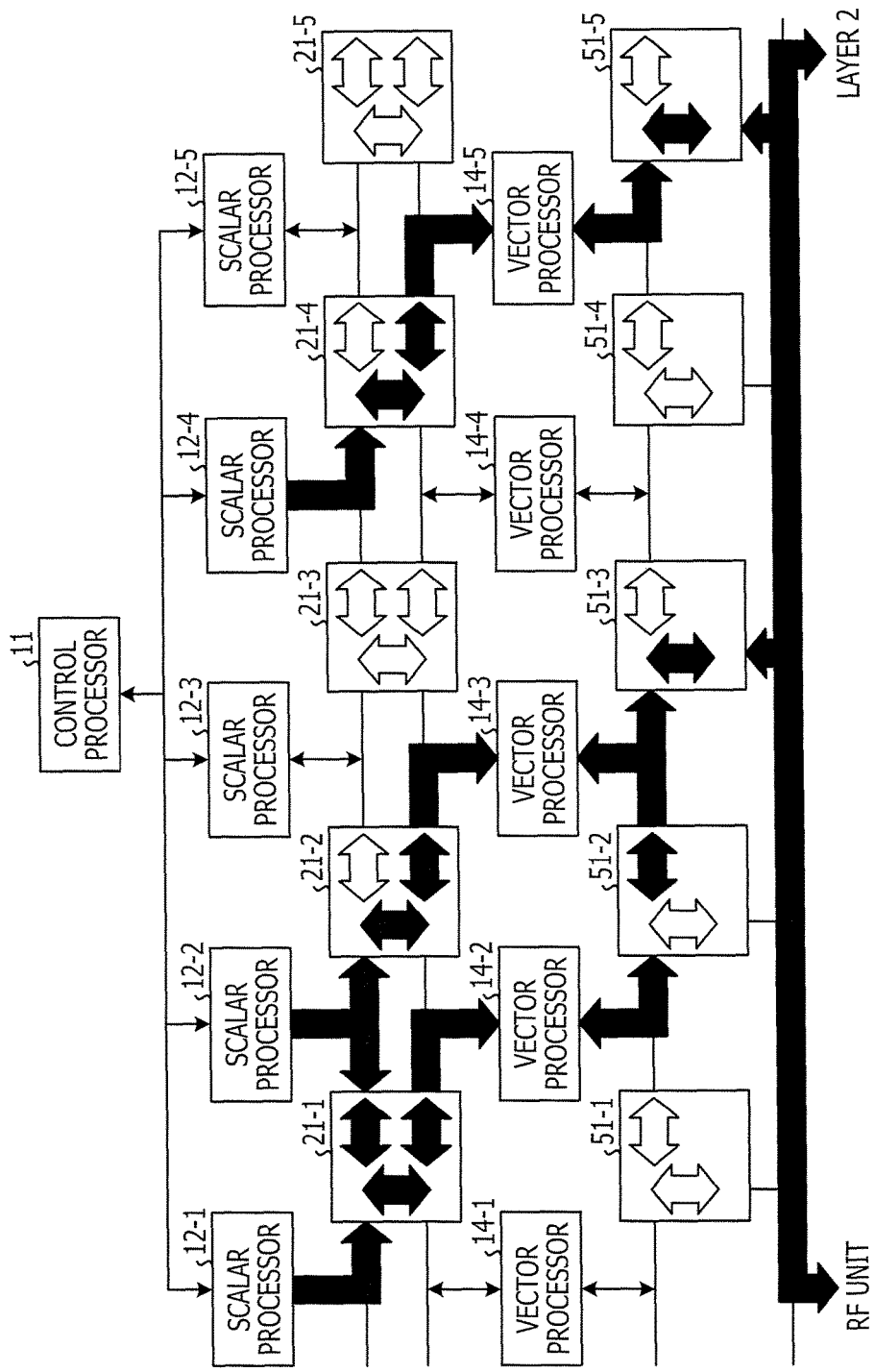
FIG. 15 is a diagram presented for explanation of a specific example of a connection pattern.

In the case where the SCH transmission/reception process under low load conditions is performed, as illustrated in FIG. 15, the control processor 11 in the signal processing device 10 turns on the scalar processors 12-1, 12-2, and 12-4, and turns off the scalar processors 12-3 and 12-5. The control processor 11 also turns on the vector processors 14-2, 14-3, and 14-5 and turns off the vector processors 14-1 and 14-4. The control processor 11 also turns on only the switch units A, B, and C of the connection switching unit 21-1, the switch units B and C of the connection switching units 21-2 and 21-4, the switch unit D of the connection switching unit 51-2, and the switch units E of the connection switching units 51-3 and 51-5, and turns off the other switch units.

Here, the SCH transmission/reception process is a process in which a control signal sent from a base station is demodulated, and user data sent from the base station is demodulated and decoded based on a demodulation scheme and a decoding scheme indicated by the control signal. The scalar processor 12-1 calculates a parameter used for demodulation of the control signal. Then, using the parameter calculated in the scalar processor 12-1, the vector processor 14-2 demodulates the control signal sent from the base station. Also, the scalar processor 12-2 calculates a parameter used for demodulation and decoding of user data. Then, using the parameter calculated in the scalar processor 12-2, the vector processor 14-2 demodulates user data sent from the base station. Then, using the parameter calculated in the scalar processor 12-2, the vector processor 14-3 decodes the user data sent from the base station.

The SCH transmission/reception process is also a process in which user data to be sent to the base station is encoded and modulated. The scalar processor 12-4 calculates a parameter used for encoding and modulation of user data. Then, using the parameter calculated in the scalar processor 12-4, the vector processor 14-5 encodes and modulates user data received from Layer 2.

Note that if the amount of resources assigned by the base station to a portable terminal equipped with the signal processing device 10 is little, the amount of data sent or received per unit time by that portable terminal is small. That is, in such a case, the processing load in the signal processing device 10 is small. Accordingly, as mentioned above, it is possible to cause the vector processor 14-2 to perform both of demodulation processing of a control signal and demodulation processing of user data. It is also possible to cause the vector processor 14-5 to perform both of encoding processing and modulation processing of user data. As a result, it is possible to turn off the vector processors 14 that are not in charge of processing, and thus power consumption in the signal processing device 10 may be reduced.

<SCH Transmission/Reception Process (during High Load Conditions)>

Figure 16:
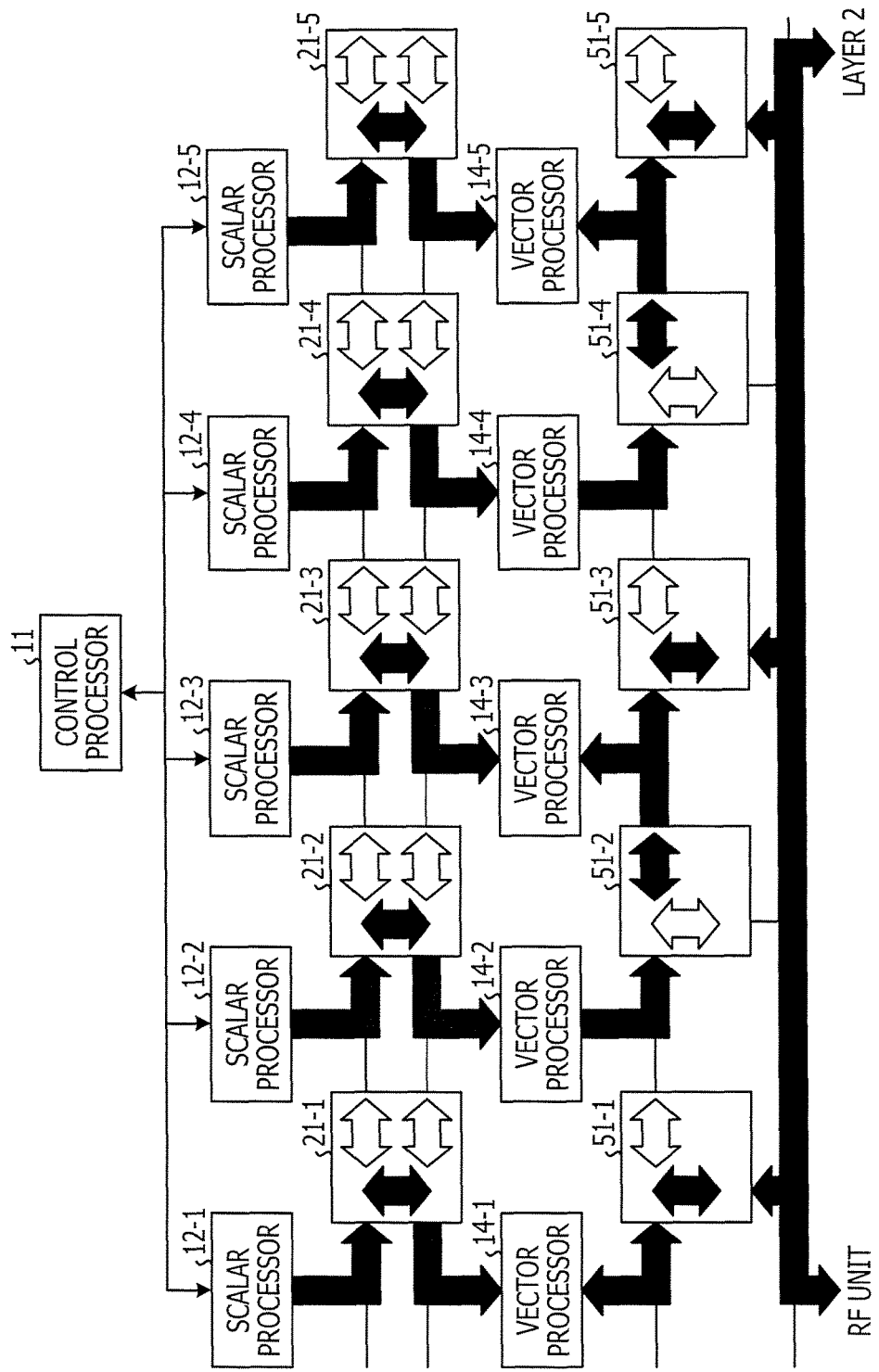
FIG. 16 is a diagram presented for explanation of a specific example of a connection pattern.

In the case where the SCH transmission/reception process under high load conditions is performed, as illustrated in FIG. 16, the control processor 11 in the signal processing device 10 turns on all the scalar processor 12-1 to 12-5 and the vector processors 14-1 to 14-5. The control processor 11 also turns on the switch units B of the connection switching units 21-1 to 21-5, the switch units E of the connection switching units 51-1, 51-3, and 51-5, and the switch units D of the connection switching units 51-2 and 51-4, and turns off the other switch units.

The scalar processor 12-1 calculates a parameter used for demodulation of a control signal. Then, using the parameter calculated in the scalar processor 12-1, the vector processor 14-1 demodulates a control signal sent from a base station. Also, the scalar processor 12-2 calculates a parameter used for demodulation of user data. Then, using the parameter calculated in the scalar processor 12-2, the vector processor 14-2 demodulates user data sent from the base station. Also, the scalar processor 12-3 calculates a parameter used for decoding of user data. Then, using the parameter calculated in the scalar processor 12-3, the vector processor 14-3 decodes the user data sent from the base station.

Also, the scalar processor 12-4 calculates a parameter used for encoding of user data. Then, using the parameter calculated in the scalar processor 12-4, the vector processor 14-4 encodes user data received from Layer 2. Also, the scalar processor 12-5 calculates a parameter used for modulation of user data. Then, using the parameter calculated in the scalar processor 12-5, the vector processor 14-5 modulates user data after the encoding.

As described above, according to this embodiment, the signal processing device 10 includes the routing unit 13 through which a control signal in the device is transmitted, as well as the routing unit 15 through which a main signal is transmitted.

With this configuration of the signal processing device 10, a main signal and a control signal are transmitted along different routes, and thus congestion may be inhibited. In addition, a main signal and a control signal are transmitted along different routes, and thus processing for determining whether a signal received by the vector processor 14 is a main signal or a control signal may be omitted.

In the signal processing device 10, the routing unit 13 includes a plurality of connection switching units 21, and switches the state of each of the connection switching units 21. Then, the routing unit 13 switches the connection states between a plurality of scalar processors 12 and a plurality of vector processors 14 to switch a vector processor 14 that is to acquire a control signal including a parameter calculated in a scalar processor 12.

With this configuration of the signal processing device 10, connections between the scalar processors 12 and the vector processors 14 may be physically switched, and therefore loads of processing, such as adding of address information to a control signal output from the scalar processor 12, may be reduced. In addition, with this configuration of the signal processing device 10, the correspondences between the scalar processors 12 and the vector processors 14 may be flexibly controlled in accordance with the type of process, the amount of processing, and so on.

Also, in the signal processing device 10, the routing unit 15 includes a plurality of connection switching units 51, and switches the states of the plurality of connection switching units 51 to switch the connection states among the vector processors 14, in accordance with the connection states mentioned above in the routing unit 13.

With this configuration of the signal processing device 10, the route of a main signal that matches with the route of a control signal may be arranged.

Second Embodiment

Figure 17:
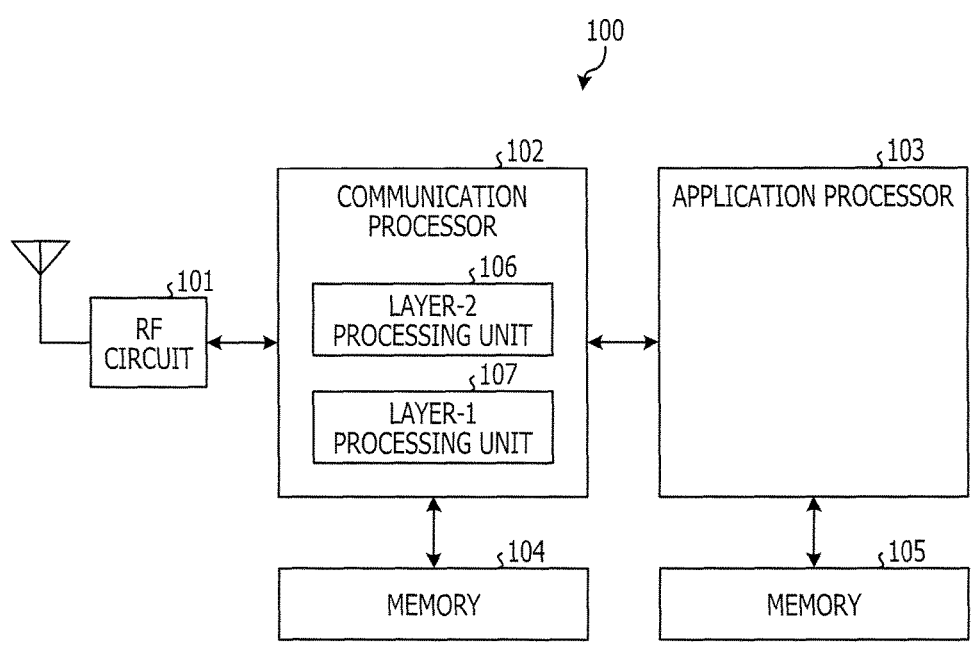
FIG. 17 is a block diagram illustrating an example of a wireless communication device of a second embodiment.

A second embodiment is related to an application for the signal processing device of the first embodiment. FIG. 17 is a block diagram illustrating an example of a wireless communication device of the second embodiment.

In FIG. 17, a wireless communication device 100 includes an RF circuit 101, a communication processor 102, an application processor 103, and memories 104 and 105. The communication processor 102 includes a layer-2 processing unit 106 and a layer-1 processing unit 107. The layer-1 processing unit 107 corresponds to the signal processing device 10 described in the first embodiment.

Examples of the communication processor 102 and the application processor 103 include a central processing unit (CPU), a digital signal processor (DSP), and a field programmable gate array (FPGA). Also, examples of the memories 104 and 105 include a random access memory (RAM) such as a synchronous dynamic random access memory (SDRAM), a read only memory (ROM), and a flash memory.

The RF circuit 101 is a module that performs wireless transmission and reception.

The communication processor 102 performs processing of Layer 1 and Layer 2 on a baseband signal. For example, the layer-1 processing unit 107 performs demodulation processing and decoding processing on a baseband signal obtained by converting the frequency of a wireless signal from a wireless frequency to a baseband frequency in the RF circuit 101. Then, the layer-2 processing unit 106 turns the decoded reception signal into Internet protocol (IP) data, and outputs the IP data to the application processor 103. The layer-2 processing unit 106 also adds a header to the IP data received from the application processor 103, and outputs the IP data. Then, the layer-1 processing unit 107 performs encoding processing and modulation processing on the data received from the layer-2 processing unit 106. In such a way, a sending signal formed in the layer-2 processing unit 106 is sent wirelessly through the RF circuit 101. The RF circuit 101 and the layer-2 processing unit 106 may be referred to as another circuit or another processor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal processing device for configuring one or more scalar or vector processors according to a switching pattern, the signal processing device comprising:
   one or more vector processors configured to perform vector processing of a signal using a parameter, the signal being representative of a radio signal received from an antenna;
   one or more scalar processors configured to perform scalar processing for generating the parameter;
   a first routing circuit comprising a first plurality of switches, the first routing circuit being coupled to the one or more vector processors and the one or more scalar processors, and being configured to transfer the parameter from the one or more scalar processors to the one or more vector processors;
   a second routing circuit comprising a second plurality of switches, the second routing circuit being coupled to the one or more vector processors and another circuit that is configured to input the signal to the second routing circuit, and being configured to transfer the signal among the one or more vector processors and the other circuit; and
   a control processor configured to output a switching control signal, based on a type of process to be performed on the signal and a correspondence table, to the first plurality of switches of the first routing circuit and the second plurality of switches of the second routing circuit, according to a switching pattern table including information on a plurality of processors including the vector processors and the scalar processors, and the correspondence table associated with the plurality of processors for the type of process to be performed on the signal,
   wherein the first plurality of switches of the first routing circuit and the second plurality of switches of the second routing circuit are respectively switched, based on the switching control signal, so as to selectively turn on or off the one or more vector processors and the one or more scalar processors for performing the type of process on the signal, based on the switching control signal that is configured to specify the switching pattern based on the type of process including one of: a cell search process, a random access channel (RACH) process, and a shared channel (SCH) transmission/reception process.

2. The signal processing device according to claim 1, wherein the first routing circuit is further configured to switch on or off each of a plurality of couplings between the one or more scalar processors and the one or more vector processors based on the switching control signal, and
   the control processor is further configured to control a switch of the one or more of the first plurality of switches of the first routing circuit to be switched on, when the switch is needed to transfer the parameter.

3. The signal processing device according to claim 2, wherein the control processor is further configured to control the switch based on one of a plurality of switching patterns, and each of the switching patterns indicates whether each of the switches is switched on or not.

4. The signal processing device according to claim 3, wherein each of the plurality of switching patterns corresponds to a different type of process.

5. The signal processing device according to claim 4, wherein each of the plurality of switching patterns corresponds to a different amount of processing.

6. The signal processing device according to claim 1,
   wherein the second routing circuit is further configured to switch on or off each of a plurality of couplings among the one or more vector processors and the other circuit based on the switching control signal, and
   the control processor is further configured to control a switch of the one or more of the second plurality of switches of the second routing circuit to be switched on, when the switch is needed to transfer the signal.

7. The signal processing device according to claim 1, wherein the first routing circuit is further configured to not transfer the signal.

8. The signal processing device according to claim 1, wherein the second routing circuit is further configured to not transfer the parameter.

9. The signal processing device according to claim 1, wherein the first routing circuit comprises a first bus and the second routing circuit comprises a second bus.

10. A signal processing method for configuring one or more scalar or vector processors according to a switching pattern, the signal processing method comprising:
    performing, by one or more vector processors, vector processing of a signal using a parameter, the signal being representative of a radio signal received from an antenna;
    performing, by one or more scalar processors, scalar processing for generating the parameter;
    transferring, by a first routing circuit comprising a first plurality of switches, the first routing circuit being coupled to the one or more vector processors and the one or more scalar processors, the parameter from the one or more scalar processors to the one or more vector processors;
    transferring, by a second routing circuit comprising a second plurality of switches, the second routing circuit being coupled to the one or more vector processors and another circuit that inputs the signal to the second routing circuit, the signal among the one or more vector processors and the other circuit; and
    outputting a switching control signal, by a control processor, based on a type of process to be performed on the signal and a correspondence table, to the first plurality of switches of the first routing circuit and the second plurality of switches of the second routing circuit, according to a switching pattern table including information on a plurality of processors including the vector processors and the scalar processors, and the correspondence table associated with the plurality of processors for the type of process to be performed on the signal,
    wherein the first plurality of switches of the first routing circuit and the second plurality of switches of the second routing circuit are respectively switched so as to selectively turn on or off the one or more vector processors and the one or more scalar processors, based on the switching control signal that is configured to specify the switching pattern based on the type of process including one of: a cell search process, a random access channel (RACH) process, and a shared channel (SCH) transmission/reception process.

11. A signal processing apparatus for digital communications, for configuring one or more scalar or vector processors according to a switching pattern, the signal processing apparatus comprising:

a plurality of scalar processors;

a first routing unit;

a plurality of vector processors coupled to the plurality of scalar processors via the first routing unit, the first routing unit comprising a first plurality of switches and being coupled to the plurality of scalar processors and the plurality of vector processors;

a second routing unit coupled to the plurality of vector processors and configured to receive a signal to be processed, the second routing unit comprising a second plurality of switches and the signal representative of a radio signal received from an antenna; and a control processor coupled to the plurality of vector processors, the plurality of scalar processors, the first routing unit and the second routing unit, wherein the control processor is configured to output a switching control signal to the first plurality of switches and the second plurality of switches, based on a type of process to be performed on the signal and a correspondence table, according to a switching pattern table including information on a plurality of processors comprising the vector processors and the scalar processors, and the correspondence table associated with the plurality of processors for the type of process to be performed on the signal; and wherein the first plurality of switches and the second plurality of switches are respectively switched so as to selectively turn on or off one or more of the plurality of vector processors and the plurality of scalar processors, based on the received switching control signal which is configured to specify the switching pattern based on the type of process including one of: a cell search process, a random access channel (RACH) process, and a shared channel (SCH) transmission/reception process.

12. The signal processing apparatus of claim 11, wherein the first routing unit is further configured to selectively turn on or off one or more of multiple couplings between the plurality of scalar processors and the plurality of vector processors, based on the switching control signal from the control processor.

13. The signal processing apparatus of claim 11, wherein the second routing unit is further configured to selectively turn on or off one or more of multiple couplings among the plurality of vector processors, based on the switching control signal from the control processor.

14. The signal processing apparatus of claim 11, wherein the control processor is further configured to:

determine the type of process to be performed on the received signal;

specify the switching pattern among a plurality of switching patterns, the switching pattern being corresponding to the determined type of process; and output the switching control signal based on the specified switching pattern to the plurality of scalar processors, the plurality of vector processors, the first routing unit and the second routing unit.

* * * * *